(12) United States Patent
Yamamoto

(10) Patent No.: US 7,501,780 B2
(45) Date of Patent: Mar. 10, 2009

(54) DOCKING SYSTEM

(75) Inventor: Daisuke Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 11/723,389

(22) Filed: Mar. 19, 2007

(65) Prior Publication Data

US 2008/0012518 A1 Jan. 17, 2008

(30) Foreign Application Priority Data

Jul. 4, 2006 (JP) ................ 2006-093938

(51) Int. Cl.
*B64C 13/20* (2006.01)

(52) U.S. Cl. ............ 318/587; 318/568.12; 318/568.17; 318/568.19; 901/1; 700/245; 700/250; 700/253; 700/254; 700/255; 701/33; 701/58; 701/200; 701/201; 701/208

(58) Field of Classification Search ............... 318/587, 318/568.12, 568.17, 568.19; 901/1; 700/245, 700/250, 253, 254, 255; 701/33, 58, 200, 701/201, 208
See application file for complete search history.

(56) References Cited

U.S. PATENT DOCUMENTS 3,768,586 A * 10/1973 Thompson et al. .......... 180/168
4,010,409 A * 3/1977 Waites ........................ 318/587
4,456,869 A * 6/1984 Schub ........................ 320/155
4,500,970 A * 2/1985 Daemmer .................... 701/25
4,573,548 A * 3/1986 Holland ..................... 180/211
4,638,445 A * 1/1987 Mattaboni .................... 701/23
4,672,280 A * 6/1987 Honjo ........................ 318/587
4,751,658 A * 6/1988 Kadonoff et al. ............ 701/301
4,777,416 A * 10/1988 George et al. .......... 318/568.12

FOREIGN PATENT DOCUMENTS

| JP | 2821375 | 8/1998 |
|----|---------|--------|
| JP | 2001-525567 | 12/2001 |
| JP | 2002-215235 | 7/2002 |
| JP | 2005-63184 | 3/2005 |

\* cited by examiner

*Primary Examiner*—Rita Leykin
(74) *Attorney, Agent, or Firm*—Nixon & Vanderhye, PC

(57) ABSTRACT

A docking system includes: a station including: a light emitter comprising light emitting elements arranged in a circular arc form so as to cause optical axes of light generated from the light emitting elements to pass through a curvature center of the circular arc; and a self-moving robot including: a body part having a circular arc part being substantially the same in curvature radius as the circular arc of the station; a movement mechanism attached to the body part to move the body part and capable of causing the body part to conduct on-the-spot rotation at a curvature center of the circular arc part; light receivers attached to the body part to receive a light signal from the light emitter; a direction detector detecting a direction in which the light signal is emitted; and a controller controlling the movement mechanism to move the body part in the direction detected by the direction detector.

10 Claims, 11 Drawing Sheets

DOCKING SYSTEM

CROSS-REFERENCE TO RELATED APPLICATION

This application is based upon and claims the benefit of priority from prior Japanese Patent Application No. 2006-93938 filed on Mar. 30, 2006 in Japan, the entire contents of which are incorporated herein by reference.

BACKGROUND OF THE INVENTION

1. Field of the Invention

The present invention relates to a self-moving robot and a docking system including the self-moving robot and a station docked with the self-moving robot.

2. Related Art

As a conventional system of docking between the self-moving robot and the station for the purpose of supplying power to the self-moving robot, conducting wired information communication or collecting dust, a system for conducting docking by laying a guidance cable that emits an electromagnetic wave, guidance tape that reflects light, or the like on a route of the self-moving robot and detecting the station by means of movement of the self-moving robot along the route, or by installing the station along a wall of the room and detecting the station by means of movement of the self-moving robot along the wall is known. In these systems, it is necessary to previously provide a track using the guidance tape or the like or utilize a different structure such as the existing wall.

Furthermore, a method of providing the self-moving robot with a map recognizing function, recognizing the current position of the self-moving robot on the basis of the rotation quantity of a gyro provided in the self-moving robot or a wheel of the self-moving robot is also known. In this method, position deviations are accumulated because of the deviation of the wheel or drifts of the gyro. According to the moving distance, therefore, the recognized position deviates from the actual position. This results in a problem that the self-moving robot cannot reach an accurate target position.

As a method for solving this problem, a method of installing various markers on the route to guide the self-moving robot has been devised.

In JP-A 2002-215235 (KOKAI), a guidance apparatus that guides the self-moving robot by using a light emitter which applies light to a light receiver formed of a plurality of light receiving elements disposed on the left and right of the self-moving robot, toward a target position is described.

In Japanese Patent No. 2821375, a method of fixing and disposing position correction means using infrared rays, transmitting and receiving specific code signals by using infrared rays between the position correction means and the self-moving robot, and measuring the isolation distance between them by using distance sensing means is described.

As for a self-moving robot described in JP-A 2005-63184 (KOKAI), a light emission device which emits a specific identification code as a light signal is disposed on the route and position coordinates are corrected by using a distance measuring unit which calculates the distance from the light emission device on the basis of the identification code of the light signal is described. They are effective as means that calculates the deviation of its own position and guides the self-moving robot without accumulating the deviation, and effective to guide the self-moving robot to the vicinity of the docking system. However, they do not conduct positioning (inclusive of the attitude) for final docking.

As for positioning for docking, it is described in JP-A 2001-525567 (KOKAI) to provide at least two light emitters having different directivities, guide the self-moving robot to the vicinity of the station by using a light emitter having a wide directivity, and further conduct positioning for docking by using a light emitter having a narrow directivity.

For uniquely determining the position and attitude of the self-moving robot at the time of docking, accurate guidance becomes necessary. In JP-A 2001-525567 (KOKAI), therefore, guidance is conducted by the light emitter having the narrow directivity. If the light emitter having the narrow directivity is used, however, there is a problem that the guidable range becomes narrow. In JP-A 2001-525567 (KOKAI), therefore, the different light emitter having the wide directivity is installed. In the guidance using the light emitter having the wide directivity, it is necessary to install the light emitter on the center of on-the-spot rotation of the self-moving robot. Therefore, there is a problem that the light emitter must be disposed solidly on a structure that is disposed over the self-moving robot.

SUMMARY OF THE INVENTION

The present invention has been made in view of these circumstances and an object of the present invention is to provide a docking system capable of conducting docking without previously using a structure other than the track or the station and correcting the own position of the self-moving robot after the docking is finished.

A docking system according to an aspect of the present invention includes:

a station comprising:
  a light emitter comprising a plurality of light emitting elements arranged in a circular arc form so as to cause optical axes of light generated from the light emitting elements to pass through a curvature center of the circular arc; and
  a first connection terminal, and a self-moving robot comprising:
  a body part having a circular arc part which is substantially the same in curvature radius as the circular arc included in the station;
  a movement mechanism attached to the body part to move the body part and capable of causing the body part to conduct on-the-spot rotation at a curvature center of the circular arc part;
  a first controller which generates a movement route on the basis of a position of the station and map information input thereto, and which controls the movement mechanism to self-move the robot to a vicinity region of the station along the generated movement route;
  light receivers attached to the body part to receive a light from the light emitter;
  a direction detector which detects a direction in which the light is emitted;
  a second controller which controls the movement mechanism to move the body part in the direction detected by the direction detector; and
  a second connection terminal for docking with the first connection terminal.

DETAILED DESCRIPTION OF THE INVENTION

Hereafter, embodiments of the present invention will be described with reference to the drawings.

First Embodiment

Figure 1:
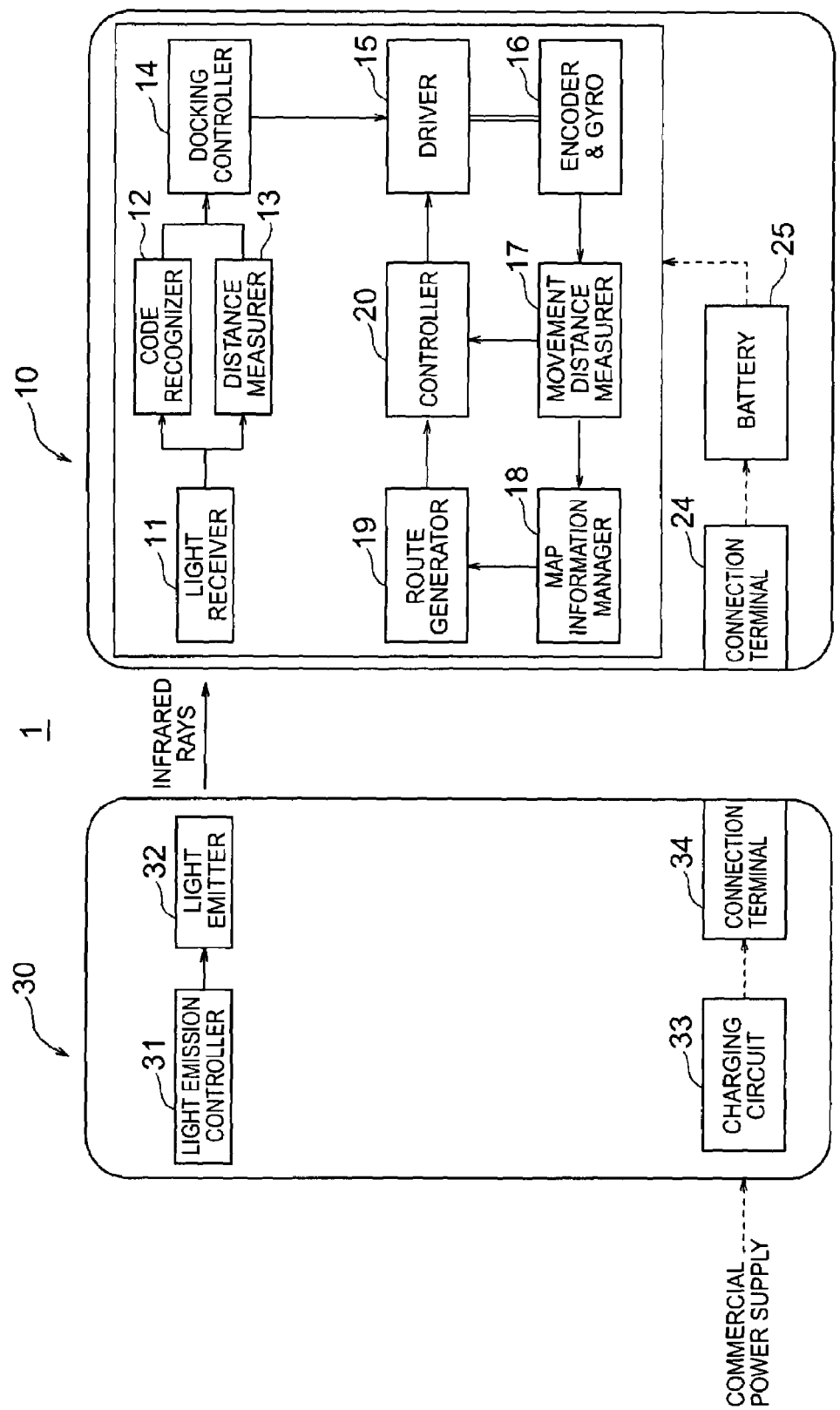
FIG. 1 is a block diagram showing a docking system according to a first embodiment of the present invention.

A docking system according to a first embodiment of the present invention is shown in FIG. 1. A docking system 1 according to the present embodiment includes a self-moving robot 10 which can be self-moving by a battery and a station 30 for charging the battery of the self-moving robot.

The self-moving robot 10 includes a body part which is not illustrated, light receivers 11, a code recognizer 12, a distance measurer 13, a docking controller 14, a driver 15, an encoder & gyro 16, a movement distance measurer 17, a map information manager 18, a route generator 19, a controller 20, a connection terminal 24 for charging, and a battery 25. Although not illustrated, the self-moving robot 10 has wheels disposed on the left and right to self-move and motors to drive these wheels and rotate the body part of the self-moving robot 10. These motors are driven by the driver 15. By the way, the encoder is attached to a wheel, and the gyro is attached to the body part of the self-moving robot 10. The light receivers 11 are provided on the left and right of the connection terminal 24 which takes a concaved shape. The wheels, the motors and the driver 15 constitute a movement mechanism for moving the body part. The on-the-spot rotation is made possible by rotating the motors for the left and right wheels in opposite directions.

The light receivers 11 include light receiving elements such as photodiodes. The infrared ray code received by the light receivers 11 is discriminated and recognized by the code recognizer 12. The distance between the light emitter of infrared rays and the self-moving robot is measured by the distance measurer 13 on the basis of the intensity of the infrared rays. A controlled variable required to move the self-moving robot to the docking station is calculated by the docking controller 14 on the basis of the discriminated code and the measured distance. The driver 15 drives the motors on the basis of the controlled variable. The current position of the self-moving robot 10 is calculated by the movement distance measurer 17 on the basis of the output of the encoder & gyro 16 by means of calculation of odometry. Peripheral map information having recording of a movable region around the station 30 which becomes the target position is previously stored in the map information manager 18. A movement route of the self-moving robot 10 is calculated by the route generator 19 on the basis of the current position and the target position. Control quantities of the motors for the left and right wheels are calculated by the controller 20 on the basis of the generated route. The motors are driven by the driver 15 on the basis of the controlled variables thus calculated.

On the other hand, the station 30 includes a light emission controller 31, a light emitter 32 which emits infrared rays, a charging circuit 33, and a connection terminal 34 for charging.

Figure 2A:
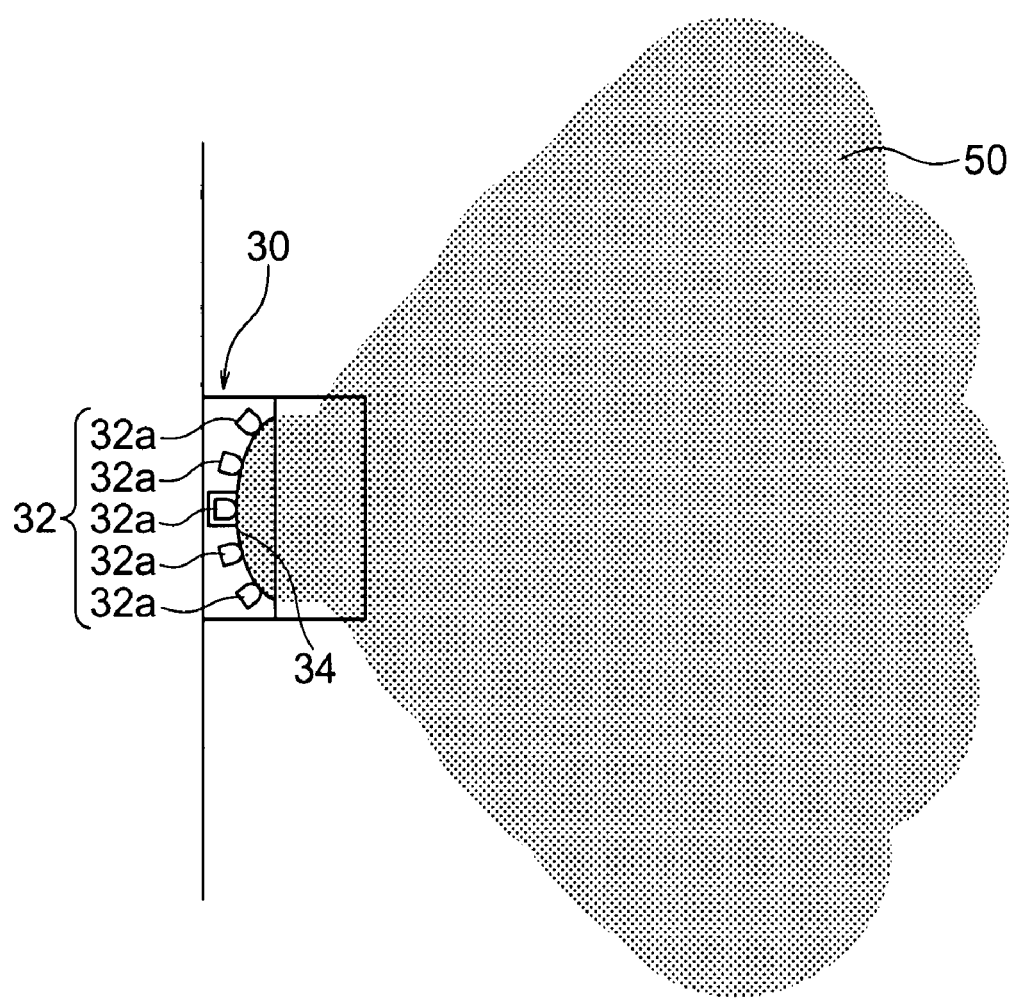
FIGS. 2A and 2B are plan views of a station according to the first embodiment.
Figure 2B:
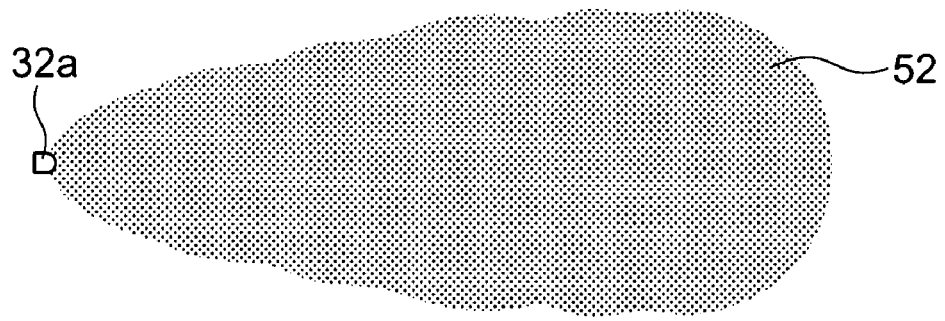

As shown in FIG. 2A, the light emitter 32 includes a plurality of light emitting elements (for example, LEDs which emit infrared rays) 32a. These light emitting elements 32a are disposed in a circular arc form in the radial direction at equal angle intervals. The radius of curvature of the circular arc is substantially equal to the radius of curvature of the body of the self-moving robot 10. The plural light emitting elements 32a are disposed so as to pass the optical axes of light beams emitted from these light emitting elements 32a through the center of curvature of the circular arc. Spaces are disposed according to directivities of the light emitting elements without lack. In the same way as infrared ray remote controllers used in AV devices and air controllers, the light emitting elements 32a emit infrared rays which are modulated by, for example, a carrier frequency 38 kHz and which have an identification code assigned to the station 30, under the control of the light emission controller 31. By disposing the light emitting elements 32a in the circular arc form as shown in FIG. 2A, a guidable range 50 can be made wider than a guidable range 52 obtained by using one light emitting element 32a shown in FIG. 2B. By the way, in the present embodiment, the connection terminal 34 for charging is provided right under the light emitting element 32a disposed in the central part as shown in FIG. 2A.

Figure 3:
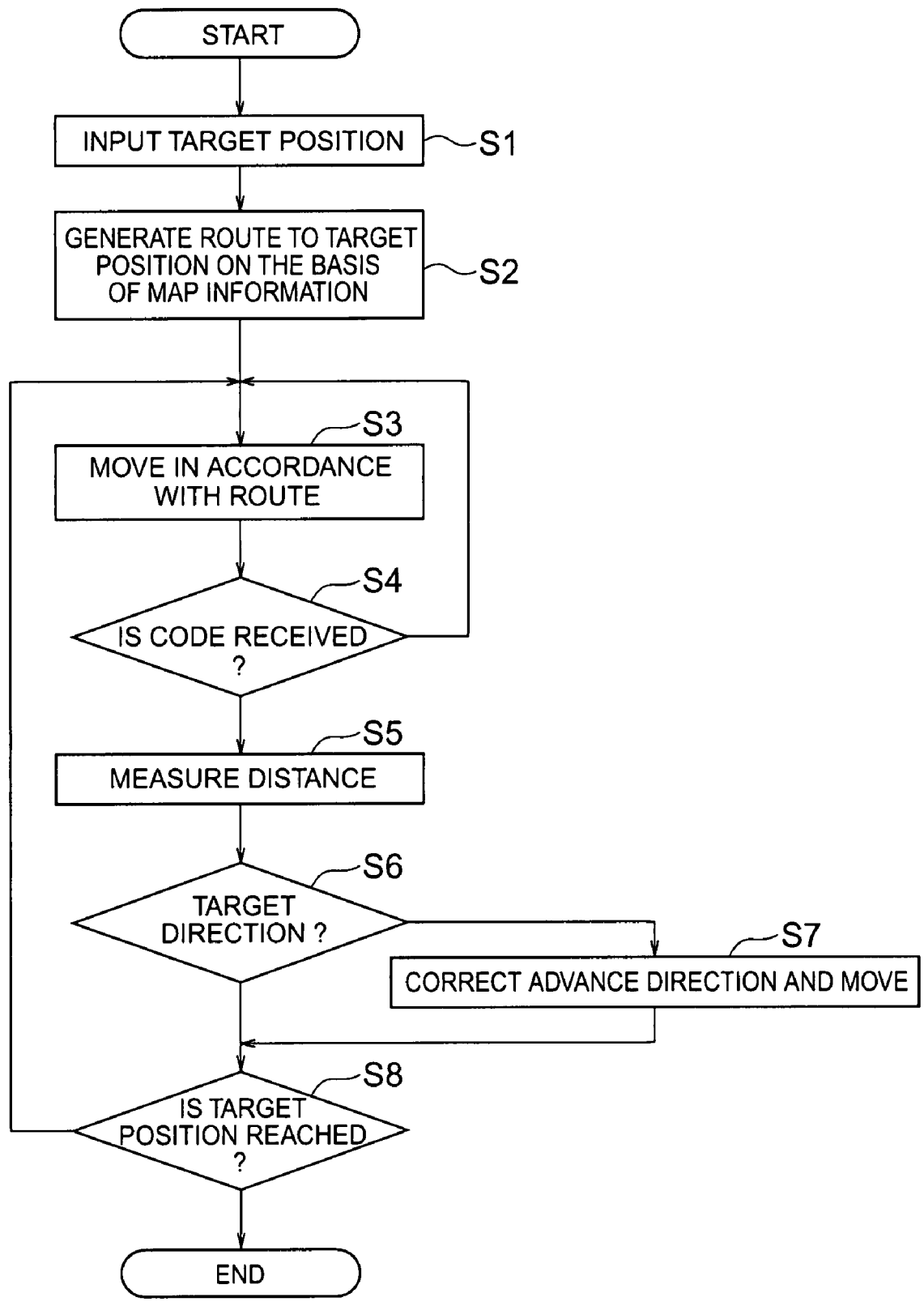
FIG. 3 is a flow chart for explaining a docking operation of a self-moving robot according to the first embodiment.

Operation of the self-moving robot 10 according to the present embodiment will now be described. First, coordinates of the station 30 for charging on the map are input to the self-moving robot 10 as a target position (step S1 in FIG. 3). The inputting may be conducted by providing a display having a touch panel (not illustrated) and pointing on a map displayed on the display. By the way, the identification code of the station to be docked for charging may be previously stored in the self-moving robot or may be input.

Figure 4:
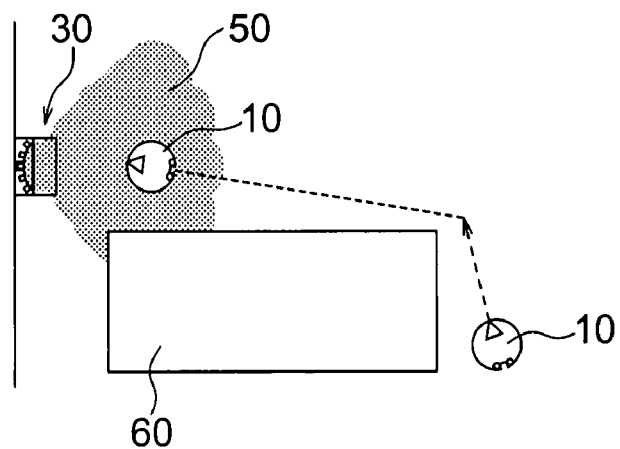
FIG. 4 is a diagram for explaining a docking operation of the self-moving robot according to the first embodiment.

Subsequently, the route generator 19 generates a route to go to the station 30 from the own position calculated on the basis of information given by the map information manager 18 and the movement position measurer 17 while avoiding an already known obstacle 60 (FIG. 4) shown on the map (step S2).

Subsequently, rotation speeds of the left and right wheels are calculated by the controller 20 so as to cause the self-moving robot to follow the generated route. The driver 15 drives the motors for the left and right wheels in accordance with the rotation speeds thus calculated. The self-moving robot moves so as to follow the route until an identification code contained in infrared rays emitted from the light emitter 32 is received (steps S3 and S4).

Subsequently, the self-moving robot 10 approaches the station 30. The self-moving robot 10 receives the infrared rays emitted from the station 30 by using the light receivers 11 attached to the left and right of the connection terminal 24. If the identification code contained in the received infrared rays coincides with the identification code stored in the self-moving robot 10, the docking controller 14 controls the driver 15 so as to make light receiving intensities of infrared rays received by the left and right light receivers 11 and measured by the distance measurer 13 equal to each other. For example, if the left light receiving intensity is strong when the self-moving robot is going straight on, the motor that drives the right wheel is made larger in the number of revolutions than the motor that drives the left wheel. If the right light receiving intensity is strong, the motor that drives the left wheel is made larger in the number of revolutions than the motor that drives the right wheel. In this way, the advance direction is modified. In other words, the distance measurer 13 has a direction detection function of detecting a direction in which the infrared rays are emitted. The docking controller 14 controls the driver 15 so as to move the body part along the detected direction. By repeating it, the self-moving robot 10 arrives at the station 30 which is the target position (steps S5, S6, S7 and S8). If the self-moving robot 10 approaches the station 30 with a distance less than a predetermined distance, it is also possible to decelerate or stop the self-moving robot 10.

A sequence leading to docking will now be described with reference to FIGS. 4 to 12. The self-moving robot 10 starts operation of docking with the station 30 in order to charge the battery 25. The self-moving robot 10 generates a movement route to avoid the obstacle 60 on the basis of the estimated own position and the position of the station 30 shown on the map, and moves to the front of the station 30 by using the self-supporting navigation.

Figure 5:
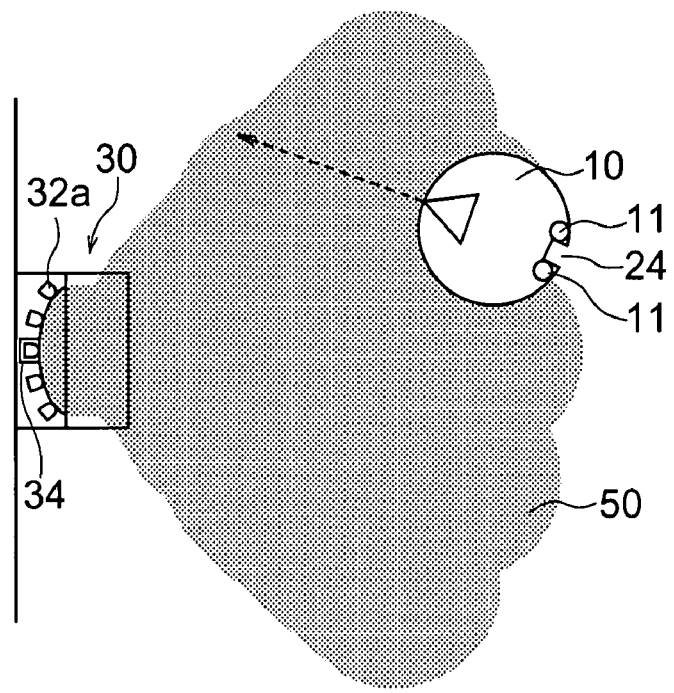
FIG. 5 is a diagram for explaining a docking operation of the self-moving robot according to the first embodiment.
Figure 6:
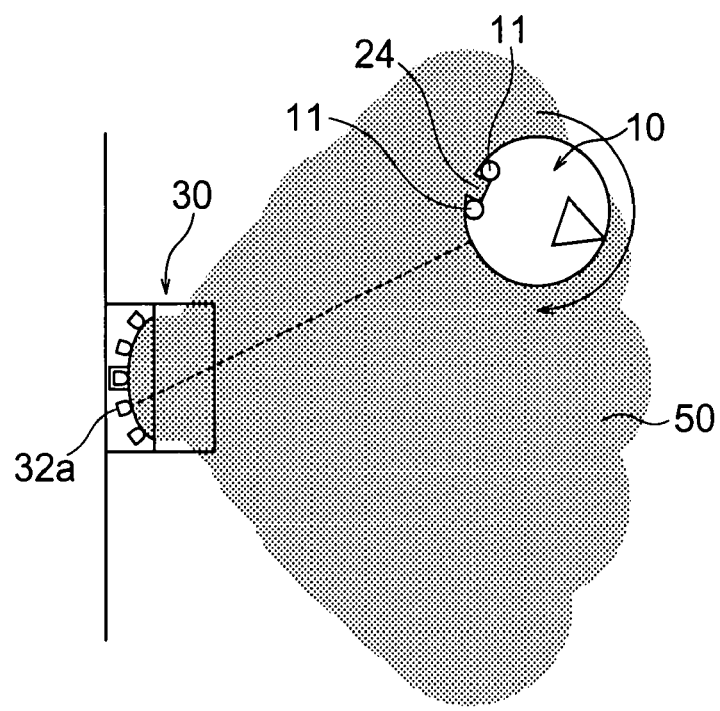
FIG. 6 is a diagram for explaining a docking operation of the self-moving robot according to the first embodiment.

If the own position of the self-moving robot 10 has moved to the front of the station 30, the self-moving robot 10 stops. The stop position is ideally the front of the station 30. As a matter of fact, however, there is an estimation error of the own position. Therefore, the stop position comes in a certain range near the station 30 (FIG. 5). After the self-moving robot 10 has stopped, it conducts on-the-spot rotation until the light receivers 11 disposed on the back of the self-moving robot 10 receive infrared rays generated from the light emitting elements 32a disposed on the station 30 (FIG. 6).

Figure 7:
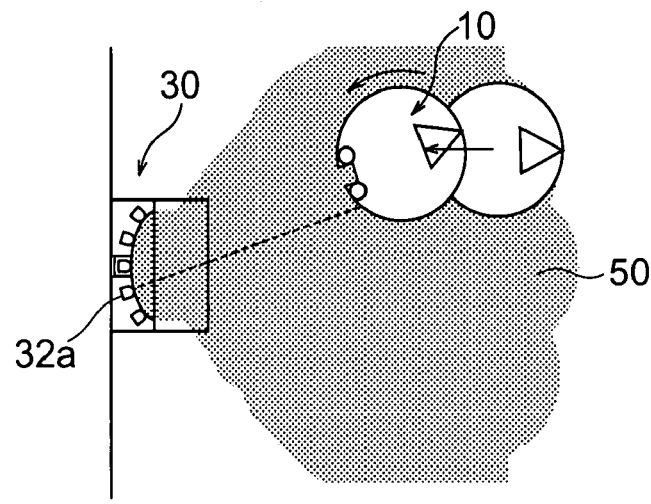
FIG. 7 is a diagram for explaining a docking operation of the self-moving robot according to the first embodiment.
Figure 8:
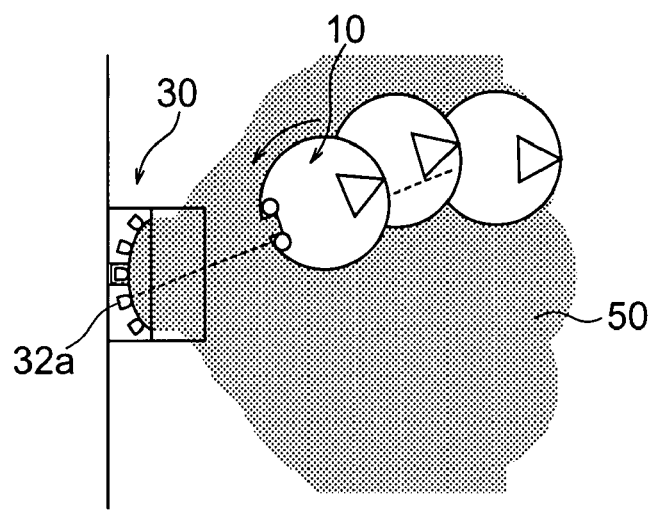
FIG. 8 is a diagram for explaining a docking operation of the self-moving robot according to the first embodiment.
Figure 9:
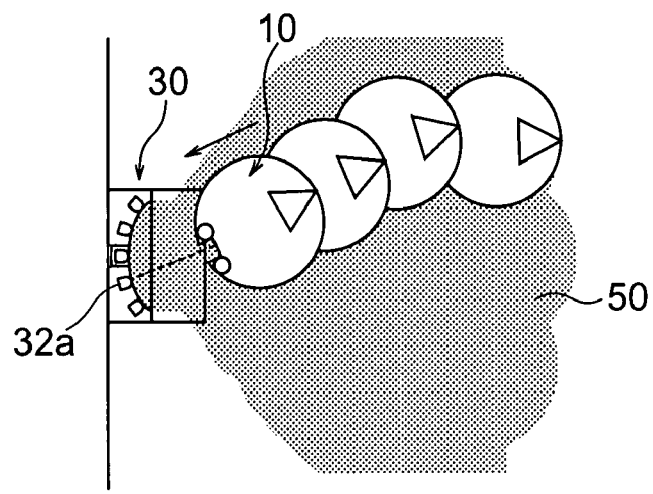
FIG. 9 is a diagram for explaining a docking operation of the self-moving robot according to the first embodiment.
Figure 10:
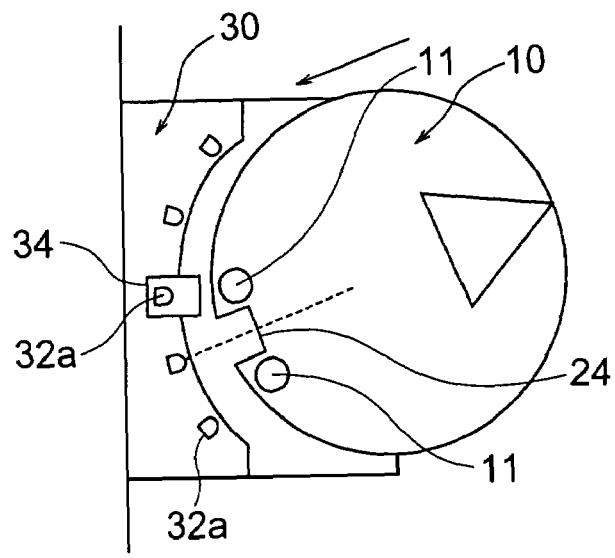
FIG. 10 is a diagram for explaining a docking operation of the self-moving robot according to the first embodiment.
Figure 11:
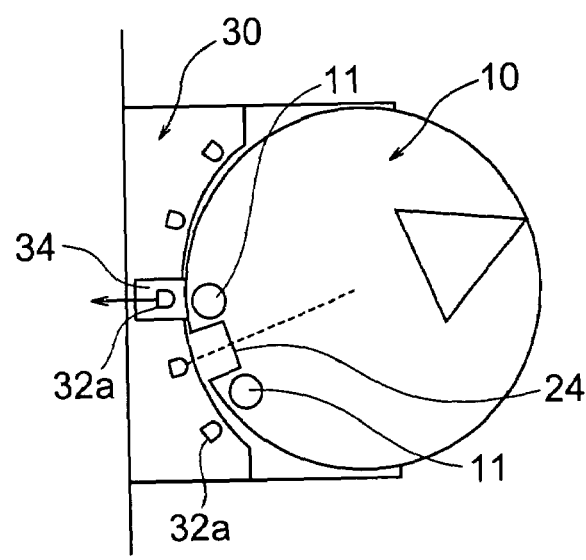
FIG. 11 is a diagram for explaining a docking operation of the self-moving robot according to the first embodiment.

Subsequently, the self-moving robot 10 retreats while changing the attitude toward the direction of the station 30 in dependence upon the infrared rays emitted from the station 30 (FIGS. 7 and 8). Detected infrared rays depend upon the position relation to the station 30. If the self-moving robot 10 approaches the station 30 and infrared rays are not received by one of the two light receivers, the self-moving robot 10 retreats while maintaining the attitude (FIG. 9). As a result of guidance using infrared rays other than infrared rays from the central light emitting element, the position is correct, but the attitude is different from the position of the connection terminal 34. As shown in FIG. 10, the self-moving robot 10 advances to the station 30 with a deviated angle. The connection terminal (supply plug) 34 is operated by a spring. The robot 10 stops with its body pressed against the supply plug 34 (FIG. 11). The robot 10 may stop by detecting an increase of the motor load caused by the pressing. Or the robot 10 may stop a predetermined time after it has become impossible to receive the infrared rays.

Figure 12:
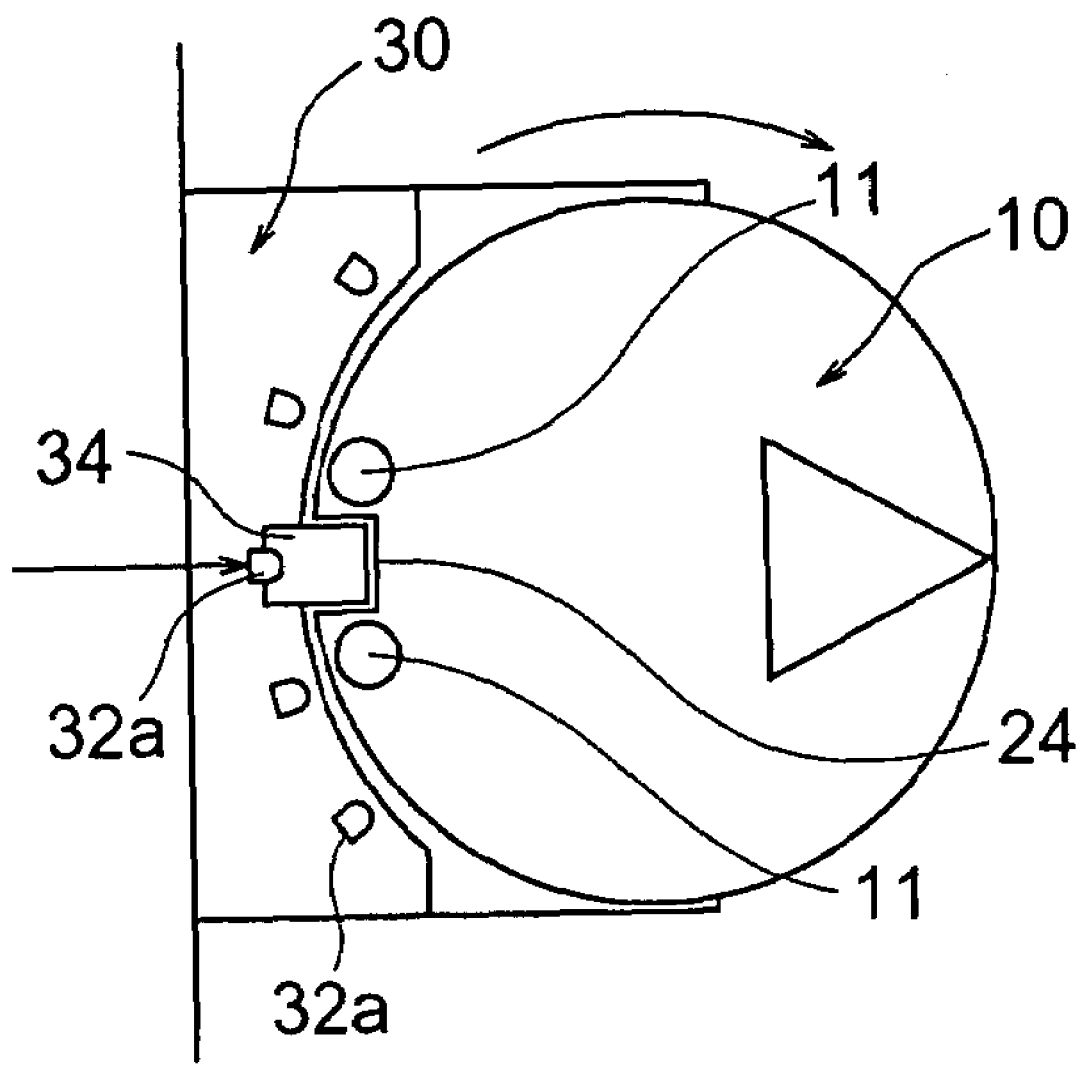
FIG. 12 is a diagram for explaining a docking operation of the self-moving robot according to the first embodiment.

Thereafter, the robot 10 conducts on-the-spot rotation in that position. As a result, the supply plug taking a convex shape of the station 30 is inserted into the concave-shaped connection terminal (connector) 24 of the robot 10, and the docking is finished (FIG. 12). After the docking, the charging circuit 33 is operated and charging is conducted. The on-the-spot rotation may be stopped by detecting an increase of the motor load caused by the insertion of the supply plug 34 and consequent restraint of the robot 10. Or the on-the-spot rotation may be stopped a predetermined time after the start of the on-the-spot rotation. Or the on-the-spot rotation may be stopped by the insertion of the plug 34 and consequent supply of power. At this time, both the position and the attitude of the robot 10 are constrained by the station 30. By docking with the station 30, therefore, the self-moving robot 10 can correct the own attitude. In addition, the self-moving robot 10 can correct the own position when moving next time. In the present embodiment, the self-moving robot 10 conducts docking with the station 30 for the purpose of charging. However, the self-moving robot 10 may conduct docking with the station 30 in order to modify the own position. In this case, charging may not be conducted after the docking.

By the way, the self-moving robot 10 may include means for communicating with the station 30 and may be configured to cause the docking controller 14 to control a rotation mechanism via the communication means so as to make the position of the connection terminal 24 coincide with the position of the connection terminal 34.

According to the present embodiment, it is possible to obtain a docking system capable of conducting docking without previously using a structure other than the track or the station and correcting the own position of the self-moving robot after the docking is finished, as heretofore described.

Second Embodiment

Figure 13:
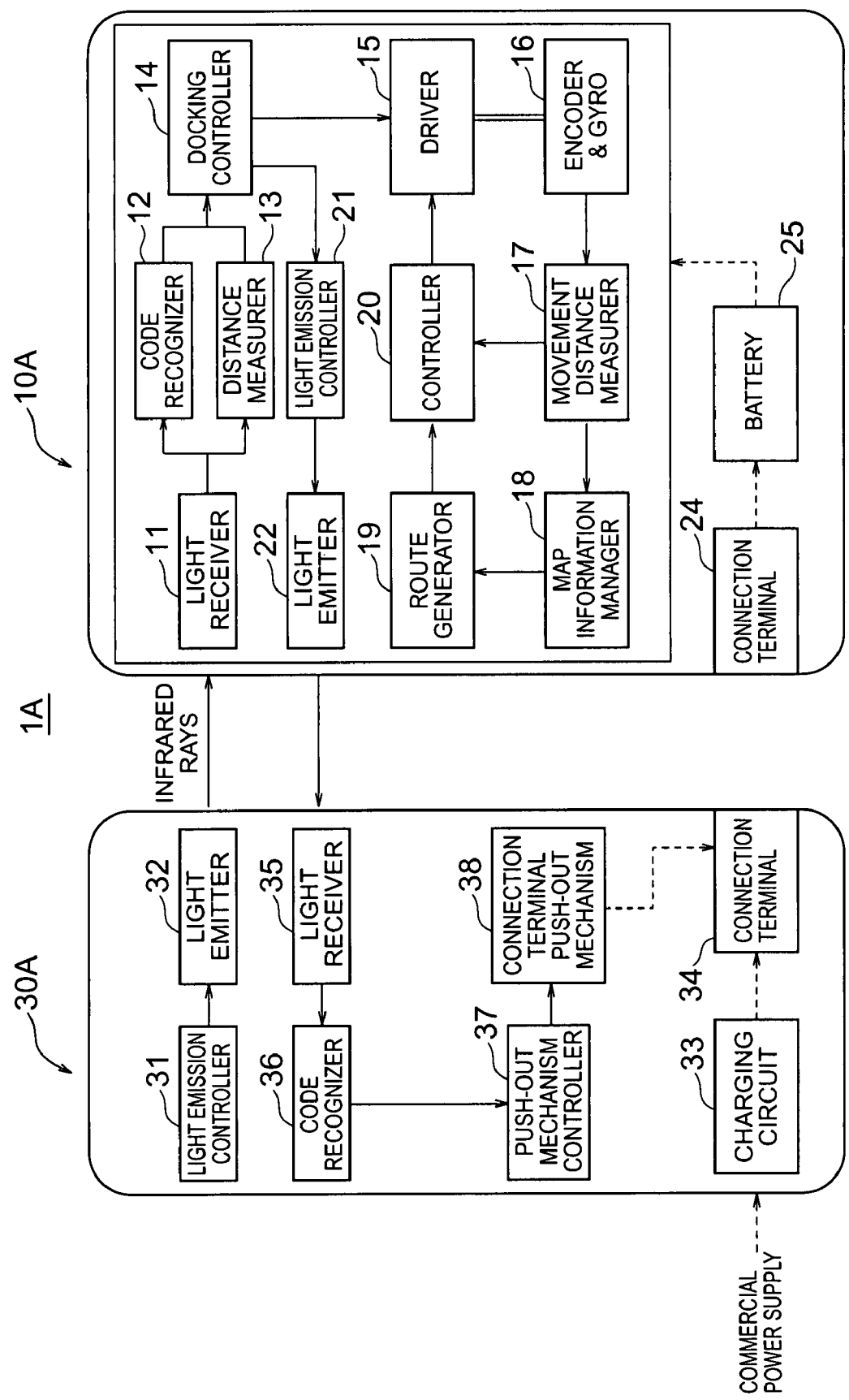
FIG. 13 is a block diagram showing a docking system according to a second embodiment of the present invention.

A docking system according to a second embodiment of the present invention is shown in FIG. 13. A docking system 1A according to the present embodiment includes a self-moving robot 10A which can be self-moving by a battery and a station 30A for charging the battery of the self-moving robot. The self-moving robot 10A has a configuration obtained by newly providing a light emission controller 21 and a light emitter 22 in the self-moving robot 10 according to the first embodiment. The station 30A has a configuration obtained by newly providing a light receiver 35, a code recognizer 36, a push-out mechanism controller 37 and a connection terminal push-out mechanism 38 in the station 30 according to the present embodiment.

Figure 14:
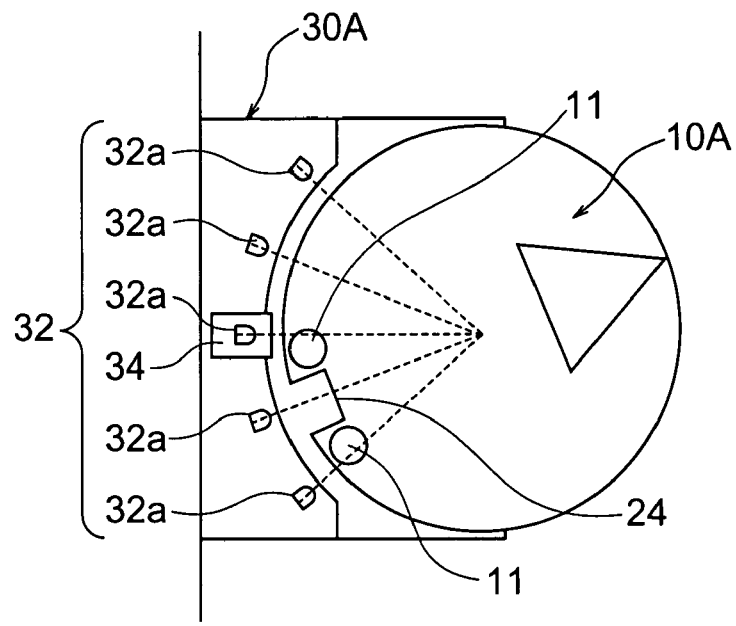
FIG. 14 is a plan view of a station according to the second embodiment.

An arrangement of the light emitter 32 in the station 30A according to the present embodiment is shown in FIG. 14. The light emitter 32 includes a plurality of light emitting elements (for example, infrared LEDs) 32a, and these light emitting elements 32a are disposed in a circular arc form in the radial direction at equal angle intervals. Spaces are disposed according to directivities of the light emitting elements without lack. Unlike the first embodiment, different identification codes are emitted from respective disposed light emitting elements 32a. In addition, optical axes of the light emitting elements cross in front of the rotation direction at the time of docking, and guidance to the front of the rotation center is conducted at the time of guidance.

In the self-moving robot 10A, the light emission controller 21 receives a signal from the docking controller 14. The light emitter 22 emits infrared rays having a specific code on the basis of the signal. The light receiver 35 in the station 30A receives the infrared rays emitted from the light emitter 22. The code recognizer 36 recognizes the code contained in the infrared rays received by the light receiver 35. In addition, the push-out mechanism controller 37 pushes out the connection terminal 34 by controlling the connection terminal push-out mechanism 38 in accordance with the received code.

Figure 15:
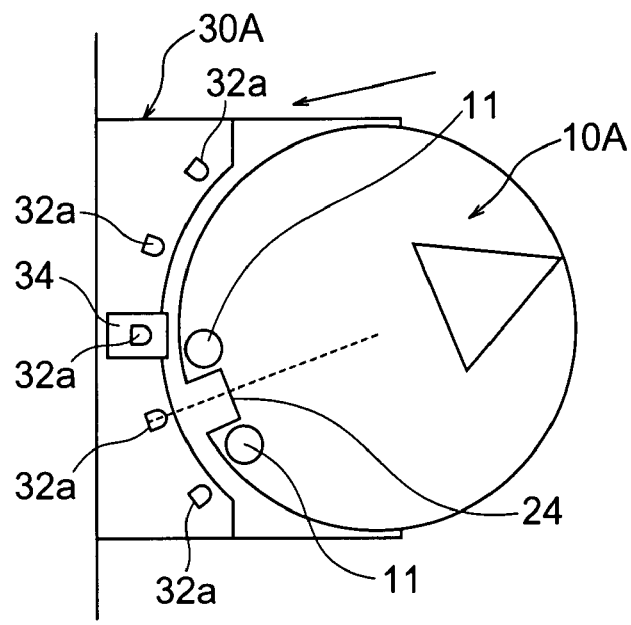
FIG. 15 is a diagram for explaining a docking operation of the self-moving robot according to the second embodiment.
Figure 16:
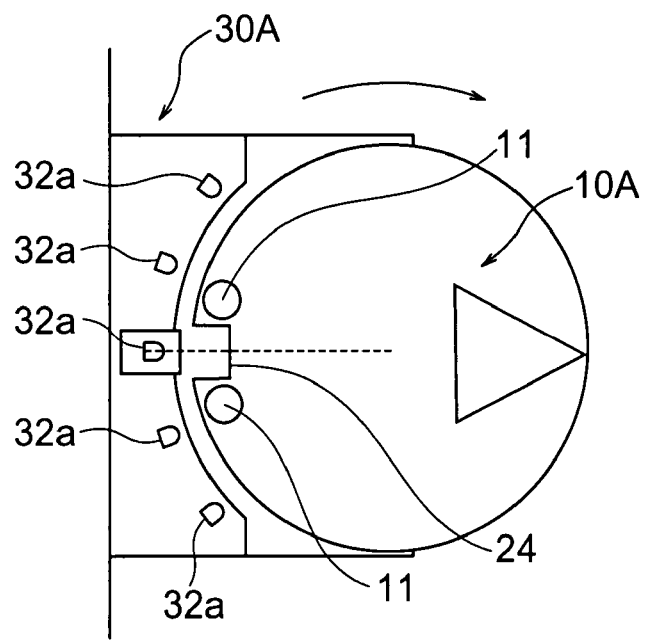
FIG. 16 is a diagram for explaining a docking operation of the self-moving robot according to the second embodiment.
Figure 17:
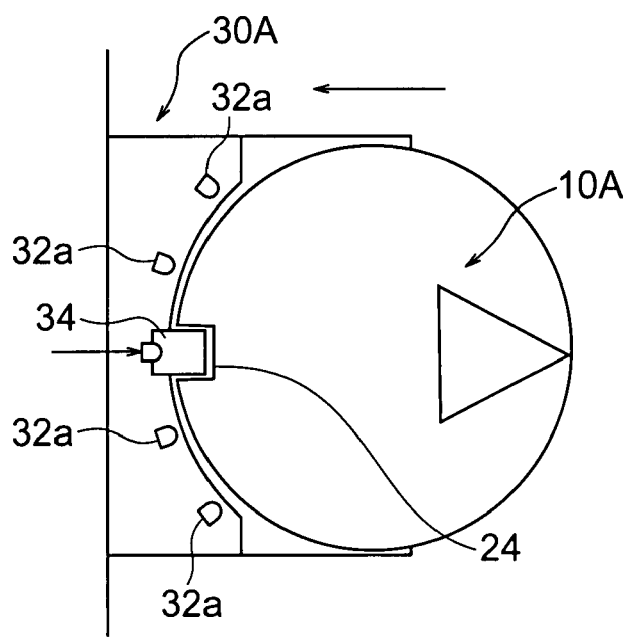
FIG. 17 is a diagram for explaining a docking operation of the self-moving robot according to the second embodiment.

A sequence leading to docking will now be described with reference to FIGS. 15 to 17. Until the self-moving robot 10A retreats while changing the attitude toward the direction of the station 30A in dependence upon the beacon emitted from the station 30A, operation is conducted in the same way as the first embodiment (FIG. 8). If the self-moving robot 10A approaches the station 30A and infrared rays are not received, the self-moving robot 10A moves a predetermined distance and stops in front of the station 30A (FIG. 15). As a result of guidance using infrared rays other than infrared rays from the central light emitting element 32a, the position is correct, but the attitude is different from the position of the connection terminal 34. As shown in FIG. 15, the self-moving robot 10A advances to the station 30A with a deviated angle. At that time, codes emitted from respective light emitting elements 32a are different. Therefore, it is possible to know from which direction the self-moving robot 10A has advanced to the station 30A. For example, in FIG. 15, the self-moving robot 10A has advanced to the station 30A in a direction of light emission direction (a direction indicated by a dotted line) of a light emitting element 32a disposed immediately under the central light emitting element. In this case, the self-moving robot 10A conducts the on-the-spot clockwise rotation in a direction to the connection terminal (plug) 34.

Upon receiving the code of the central light emitting element 32a, the self-moving robot 10A stops and the light emitter 22 in the robot 10A emits signal light to the light receiver 35 in the station 30A to cause the plug 34 to be pushed out. This signal is received by the light receiver 35 in the station 30A. On the basis of the received signal, the push-out mechanism controller 37 pushes out the plug 34 to the connection position via the code recognizer 36. Thereafter, the robot 10A retreats. If the plug 34 is connected to the connector 24, the robot 10A stops and the docking is completed.

In the present embodiment, the robot 10A is guided to the front of the station 30A. Except the plug 34, therefore, the station 30A and the robot 10A do not come in contact with each other. As a result, scratches are prevented from being caused by the contact of the station 30A with the robot 10A. When leaving the station 30A, the light emitter 22 in the robot 10A emits a signal to receive the plug 34 of the station 30A. If the light receiver 35 in the station 30A receives this signal, the station 30A receives the connection terminal 34.

In the same way as the first embodiment, it is possible in the present embodiment to obtain a docking system capable of conducting docking without previously using a structure other than the track or the station and correcting the own position of the self-moving robot after the docking is finished, as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A docking system comprising:
    a station comprising:
        a light emitter comprising a plurality of light emitting elements arranged in a circular arc form so as to cause optical axes of light generated from the light emitting elements to pass through a curvature center of the circular arc; and
        a first connection terminal, and
    a self-moving robot comprising:
        a body part having a circular arc part which is substantially the same in curvature radius as the circular arc included in the station;
        a movement mechanism attached to the body part to move the body part and capable of causing the body part to conduct on-the-spot rotation at a curvature center of the circular arc part;
        a first controller which generates a movement route on the basis of a position of the station and map information input thereto, and which controls the movement mechanism to self-move the robot to a vicinity region of the station along the generated movement route;
        light receivers attached to the body part to receive a light from the light emitter;
        a direction detector which detects a direction in which the light is emitted;
        a second controller which controls the movement mechanism to move the body part in the direction detected by the direction detector; and
        a second connection terminal for docking with the first connection terminal.

2. The docking system according to claim 1, wherein the station comprises a light emission controller to control the light emitting elements so as to generate different light beams respectively, and
the direction detector detects and discriminates a direction of one of the light emitting elements.

3. The docking system according to claim 1, wherein the second connection terminal comprises a concave part, the first connection terminal comprises a plug and a spring element, and
the plug is pushed by the spring element to fit in the concave part of the second connection terminal and thereby conduct positioning of the self-moving robot.

4. The docking system according to claim 1, wherein the self-moving robot comprises means for communication with the station,
the second controller controls the movement mechanism via the communication means to make a position of the second connection terminal coincide with a position of the first connection terminal.

5. The docking system according to claim 1, wherein the second controller controls the movement mechanism to move the body part in the direction detected by the direction detector,
when the body part has reached the curvature center of the circular arc of the light emitting elements arranged in the circular form in the station, the second controller controls the movement mechanism to stop the body part, cause on-the-spot rotation, and thereby conduct positioning of the self-moving robot so as to connect the first connection terminal to the second connection terminal.

6. The docking system according to claim 5, wherein the light emitting elements comprise a first light emitting element and a second light emitting element disposed so as to be symmetrical to the first light emitting element,
the first connection terminal is disposed under the first light emitting element, and
when light from the first light emitting element is detected, the second controller controls the movement mechanism to stop the on-the-spot rotation.

7. The docking system according to claim 5, wherein
the station comprises a light emission controller to control the light emitting elements so as to generate different light beams respectively, and
the direction detector detects and discriminates a direction of one of the light emitting elements.

8. The docking system according to claim 7, wherein
the light emitting elements comprise a first light emitting element and a second light emitting element disposed so as to be symmetrical to the first light emitting element,
the first connection terminal is disposed under the first light emitting element, and
when light from the first light emitting element is detected, the second controller controls the movement mechanism to stop the on-the-spot rotation.

9. The docking system according to claim 5, wherein
the second connection terminal comprises a concave part,
the first connection terminal comprises a plug and a spring element, and
the plug is pushed by the spring element to fit in the concave part of the second connection terminal and thereby conduct positioning of the self-moving robot.

10. The docking system according to claim 5, wherein
the self-moving robot comprises means for communication with the station,
the second controller controls the movement mechanism via the communication means to make a position of the second connection terminal coincide with a position of the first connection terminal.

* * * * *

UNITED STATES PATENT AND TRADEMARK OFFICE
CERTIFICATE OF CORRECTION

| | | |
|---|---|---|
| PATENT NO. | : 7,501,780 B2 | Page 1 of 1 |
| APPLICATION NO. | : 11/723389 | |
| DATED | : March 10, 2009 | |
| INVENTOR(S) | : Yamamoto | |

It is certified that error appears in the above-identified patent and that said Letters Patent is hereby corrected as shown below:

Title Page;

"(30) Foreign Application Priority Data

Jul. 4, 2006    (JP) ..........................2006-093938"

should be:

--(30) Foreign Application Priority Data

Mar. 30, 2006   (JP) ..........................2006-093938--

Signed and Sealed this

Fifteenth Day of December, 2009

David J. Kappos
*Director of the United States Patent and Trademark Office*